US007392427B2

(12) United States Patent
Ikezawa

(10) Patent No.: US 7,392,427 B2
(45) Date of Patent: Jun. 24, 2008

(54) SYSTEM AND METHOD FOR CONTROLLING DATA BACKUP BY USER AUTHORIZATION

(75) Inventor: Mitsuru Ikezawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 11/024,645

(22) Filed: Dec. 30, 2004

(65) Prior Publication Data

US 2006/0117220 A1      Jun. 1, 2006

(30) Foreign Application Priority Data

Nov. 16, 2004    (JP)    ............................. 2004-331664

(51) Int. Cl.
    *G06F 11/00*    (2006.01)
(52) U.S. Cl. .......................................... 714/13; 713/150
(58) Field of Classification Search ...................... 714/4, 714/6, 8, 13, 42; 713/150, 185
    See application file for complete search history.

(56) References Cited

U.S. PATENT DOCUMENTS 7,251,828 B1 * 7/2007 Hamid et al. .................. 726/9

2004/0117636 A1 * 6/2004 Cheng .......................... 713/185
2004/0177098 A1   9/2004 Tamura et al.
2005/0005093 A1 * 1/2005 Bartels et al. ............... 713/150
2005/0223216 A1 * 10/2005 Chan et al. .................. 713/153

FOREIGN PATENT DOCUMENTS

JP    2002-351747    12/2002

\* cited by examiner

*Primary Examiner*—Nadeem Iqbal
(74) *Attorney, Agent, or Firm*—Mattingly, Stanger, Malur & Brundidge, PC

(57) ABSTRACT

The invention is intended to provide a backup control technique for protecting the safety of data stored in a storage system while minimizing the processing load in the storage system. A storage system 10 receives a command from a host computer 50 to write data control limitation data stipulating backup limitations, the data control limitation data is written to an expanded VTOC part where a storage area protected as the VTOC among the storage areas in the volume has been expanded, and backup is controlled based on the data control limitation data written to the expanded VTOC part.

14 Claims, 11 Drawing Sheets

Fig.5

<DATA CONTROL LIMITATION DATA>

| DATA CONTROL MODE | DATA CONTROL CONDITIONS | |
|---|---|---|
| | NUMBER OF AUTHORIZATIONS | AUTHORIZATION TIME ZONE |
| 0(AUTHORIZED) | 10 | SUNDAY |

<LIMITATION COMMAND>

| NAME OF VOLUME TARGETED FOR LIMITATION | DATA CONTROL MODE | DATA CONTROL CONDITIONS | | AUTHENTICATION DATA |
|---|---|---|---|---|
| | | NUMBER OF AUTHORIZATIONS | AUTHORIZATION TIME ZONE | |
| VOLUME B01 | 0 (AUTHORIZED) | 10 | SUNDAY | XXXXXX |

Fig.11

<LIMITATION TABLE>

| VOLUME NAME | DATA CONTROL MODE | DATA CONTROL CONDITIONS | |
|---|---|---|---|
| | | NUMBER OF AUTHORIZATIONS | AUTHORIZATION TIME ZONE |
| VOLUME BO1 | 0 (AUTHORIZED) | 10 | SUNDAY |
| VOLUME BO2 | 0 (AUTHORIZED) | 0 (UNLIMITED) | 0 (UNLIMITED) |
| VOLUME BO3 | 1 (NOT AUTHORIZED) | – | – |
| VOLUME BO4 | 0 (AUTHORIZED) | 5 | 1:00~4:00 |
| VOLUME BO5 | 0 (AUTHORIZED) | 10 | 10TH OF EVERY MONTH |
| ... | ... | ... | ... |

SYSTEM AND METHOD FOR CONTROLLING DATA BACKUP BY USER AUTHORIZATION

CROSS-REFERENCES TO RELATED APPLICATION

This application relates to and claims priority from Japanese Patent Application No. P2004-331664, filed on Nov. 16, 2004, the entire disclosure of which is incorporated herein by reference.

BACKGROUND

The present invention relates to a backup control technique for controlling the backup of data stored in a storage system.

A conventional technique of backup control for protecting the safety of data is to encrypt data using an encryption key when backing up data stored in a storage system, and to decrypt the data using the encryption key when restoring the backed up data. A conventional backup control technique is disclosed in Japanese Published Unexamined Application 2002-351747, for example.

SUMMARY

However, a problem in conventional back up control techniques is that the need to encrypt data when backing up the data and to decrypt the data when the data is restored results in a greater encryption/decryption processing load on the storage system.

In view of the above, an object of the present invention is to provide a backup control technique for protecting the safety of data stored in a storage system while minimizing the processing load in the storage system.

In order to resolve the problem described above, the present invention is directed to a backup control method for controlling a backup of data stored in a volume which is provided to a host computer by a storage system, said storage system comprises a control computer that controls data transfer between said host computer and said volume, said stored data is handled by said host computer running prescribed application software, said backup control method comprising the steps of: (a) receiving a write request by said control computer for writing limitation data for stipulating a limitation of said backup from said host computer running control application software different from said prescribed application software; (b) writing said limitation data, in accordance with said received write request, to a prescribed storage area in said storage system, said prescribed storage area is different from a storage area where said stored data is stored; and (c) controlling said backup based on said limitation data written to said prescribed storage area.

In order to resolve the problem described above, the present invention is directed to a storage system provides a volume in which data is stored to a host computer and controls a backup of said stored data, said stored data is handled by said host computer running prescribed application software, said storage system comprising: a receiving unit that receives a write request for writing limitation data for stipulating a limitation of said backup from said host computer running control application software different from said prescribed application software; a writing unit that writes said limitation data, in accordance with said received write request, to a prescribed storage area in said storage system, said prescribed storage area is different from a storage area where said stored data is stored; and a back up control unit that controls said backup based on said limitation data written to said prescribed storage area.

The backup control method and storage system of the present invention can limit the backup of data stored on the storage system side by writing limitation data to a prescribed storage area in the storage system upon commands by users with authorized access on the host computer side. It is thus possible to protect the safety of data stored in a storage system while minimizing the processing load on the storage system. These and other objects, features, aspects, and advantages of the present invention will become more apparent from the following detailed description of the preferred embodiments with the accompanying drawings.

BRIEF DESCRIPTION OF THE DRAWINGS

FIG. 5 illustrates an example of data control limitation data;

FIG. 11 illustrates an example of a limitation table;

DESCRIPTION OF THE PREFERRED EMBODIMENTS

The backup control technique is illustrated in the following examples in the following order in order to further elucidate the structure and operation of the invention described above.

Order:
A. First Example;
   A(1). Structure of Electronic Computer System CS;
   A(2). Operation of Electronic Computer System CS;
B. Second Example;
C. Other Embodiments.

A. First Example

Figure 1:
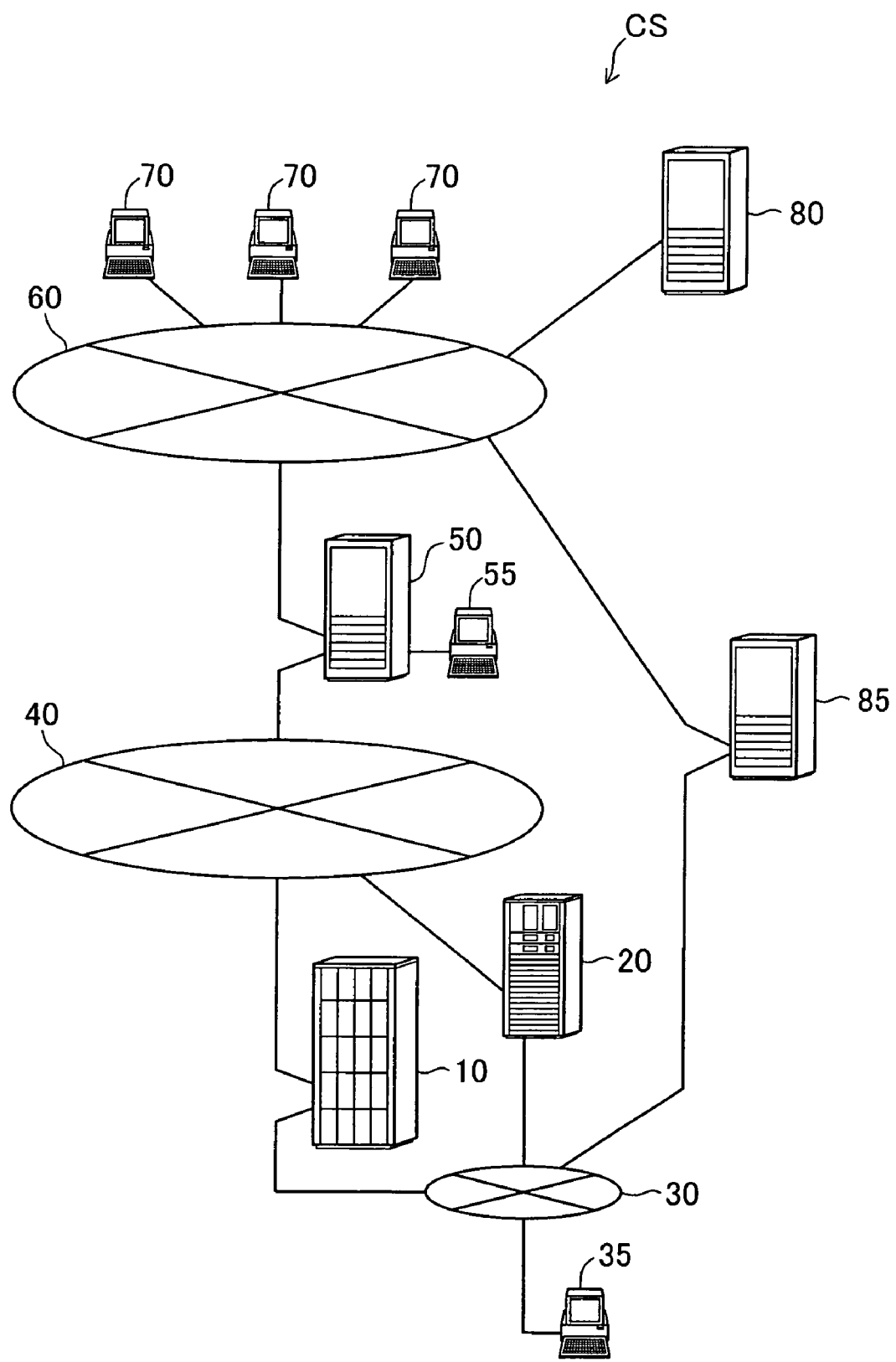
FIG. 1 illustrates a structure of an electronic computer system CS.

A(1). Structure of Electronic Computer System CS:

FIG. 1 illustrates the structure of an electronic computer system CS. The electronic computer system CS, which is an embodiment of the invention, comprises a storage system 10 forming volumes, which is a storage area where data can be stored, a storage system 20 for backing up the data stored on the storage system 10, a storage control terminal 35 for controlling the storage systems 10 and 20, a host computer 50 for using the volume of the storage system 10, a host control terminal 55 for controlling the host computer 50, a plurality of client computers 70 which are clients of the host computer 50, and a certificate server 80 for verifying users making use of the host computer 50 and client computers 70.

The storage systems 10 and 20 are connected with the storage control terminal 35 through a network 30. The storage system 10, host computer 50, and storage system 20 are each connected to a SAN (Storage Area Network) 40 capable of transferring data by a fibre channel. The host computer 50 and the plurality of client computers 70 are connected through a network 60. The certificate server 80 is connected to the network 60, and the host computer 50 and client computers 70 can make use of the authentication by the certificate server 80 through the network 60. A firewall 85 is set up between the network 30 and network 60, and the storage systems 10 and 20 and the storage control terminal 35 can make use of the authentication by the certificate server 80 through the firewall 85.

Figure 2:
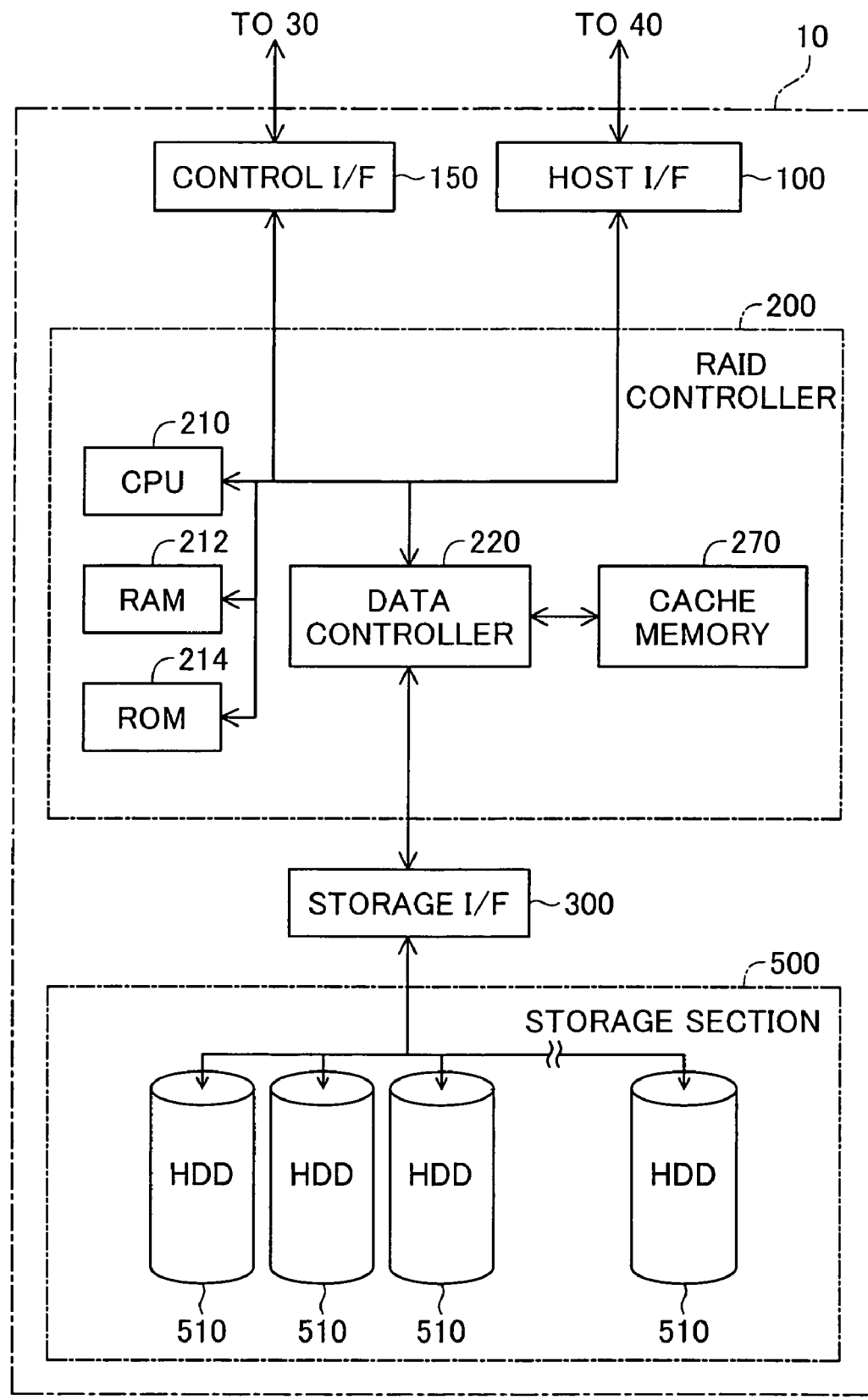
FIG. 2 is a block diagram of the internal structure of the storage system 10.

FIG. 2 is a block diagram of the internal structure of the storage system 10. The storage system 10 comprises a storage section 500 composed of a plurality of hard disk drives (HDDs) 510 having a plurality of storage areas capable of storing data, a RAID controller 200 for controlling the storage section 500 by the RAID (Redundant Arrays of Independent (Inexpensive) Disk) technology, a host I/F 100 for switching the interface between the SAN 40 and RAID controller 200, a control I/F 150 for switching the interface between the network 30 and RAID controller 200, and a storage I/F 300 for switching the interface between the RAID controller 200 and storage section 500.

The RAID controller 200 of the storage system 10 comprises a central processing unit (CPU) 210 for executing computing processes to control the operations of the various parts of the RAID controller 200, read only memory (ROM) 214 for pre-storing programs stipulating the computer processes of the CPU 210, random access memory (RAM) 212 for temporarily storing data handled by the CPU 210, a data controller 220 with a circuit for controlling the transfer of data with the storage section 500, and a cache memory 270 for temporarily storing data handled by the data controller 220.

The ROM 214 of the RAID controller 200 stores a variety of application software (referred to below as applications) in addition to the operating system (OS) as CPU 210 programs. Examples of the various types of application software stored in ROM 214 include programs related to the back up of data stored in the storage section 500, and programs for controlling the plurality of HDDs 510 of the storage section 500 using RAID. A plurality of logical volumes is formed by the RAID controller 200 in the storage section 500.

The storage system 20 is an off-line storage system for backing up the data stored in the storage system 10, and comprises a plurality of magnetic tape drives for reading and writing data to magnetic tape housed in tape cartridges, as well as several interfaces. The tape cartridges in which data is stored by the storage system 20 is taken from the storage system 20 and stored off line.

The host computer 50 comprises hardware such as a CPU, ROM, RAM, HDD, and various interface circuits, etc. Various applications in addition to the OS are installed in the host computer 50. Applications for running data processing, applications for making use of the storage system 10, and the like are installed as applications in the host computer 50.

The storage control terminal 35, host control terminal 55, client computer 70, certificate server 80, and firewall 85 are computers comprising various types of hardware such as CPU, ROM, RAM, HDD, and various interface circuits. Various types of software are installed to run their respective functions.

Figure 3:
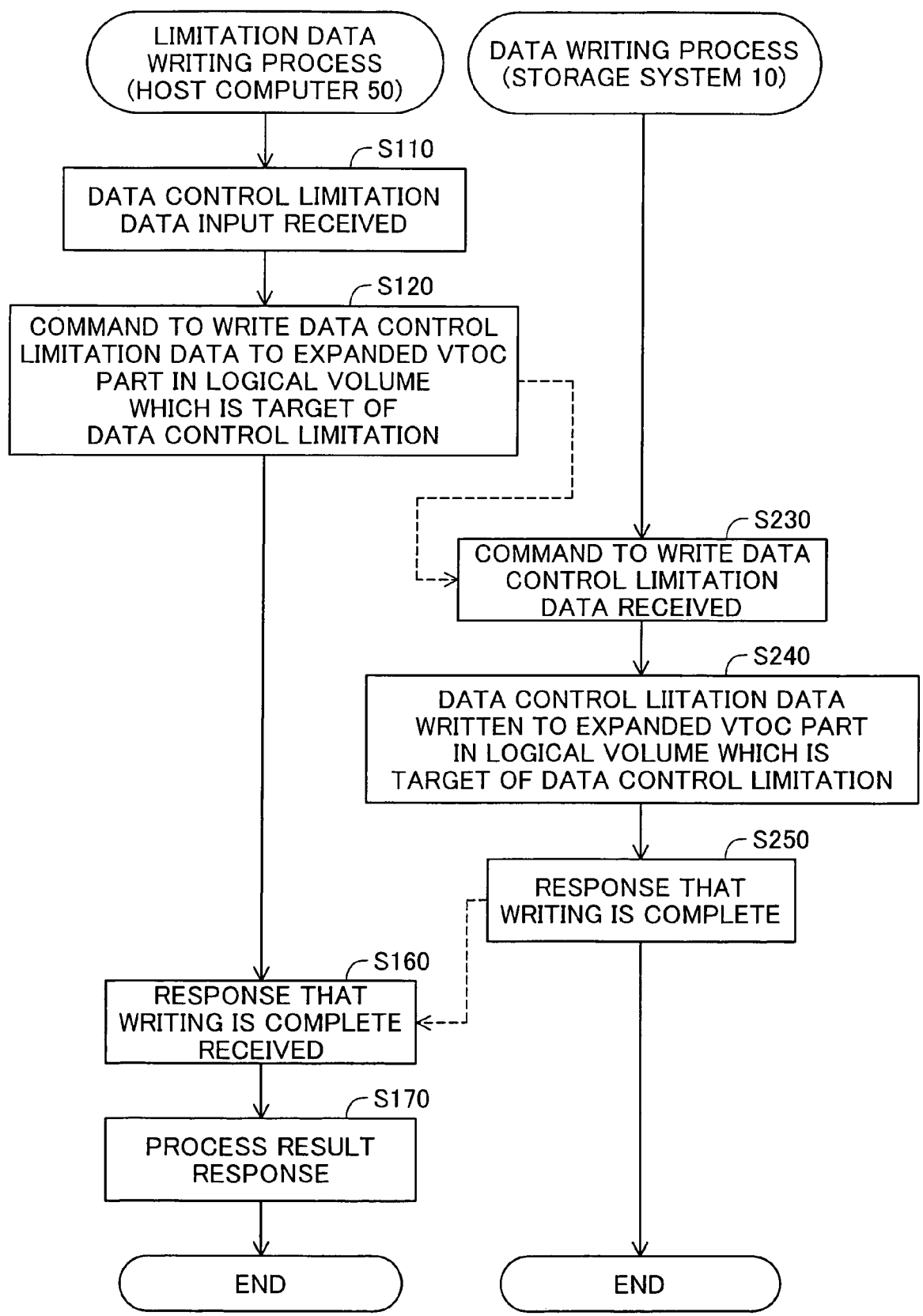
FIG. 3 is a flowchart of a limitation data writing process in the host computer 50 and a data writing process in the storage system 10.
Figure 4:
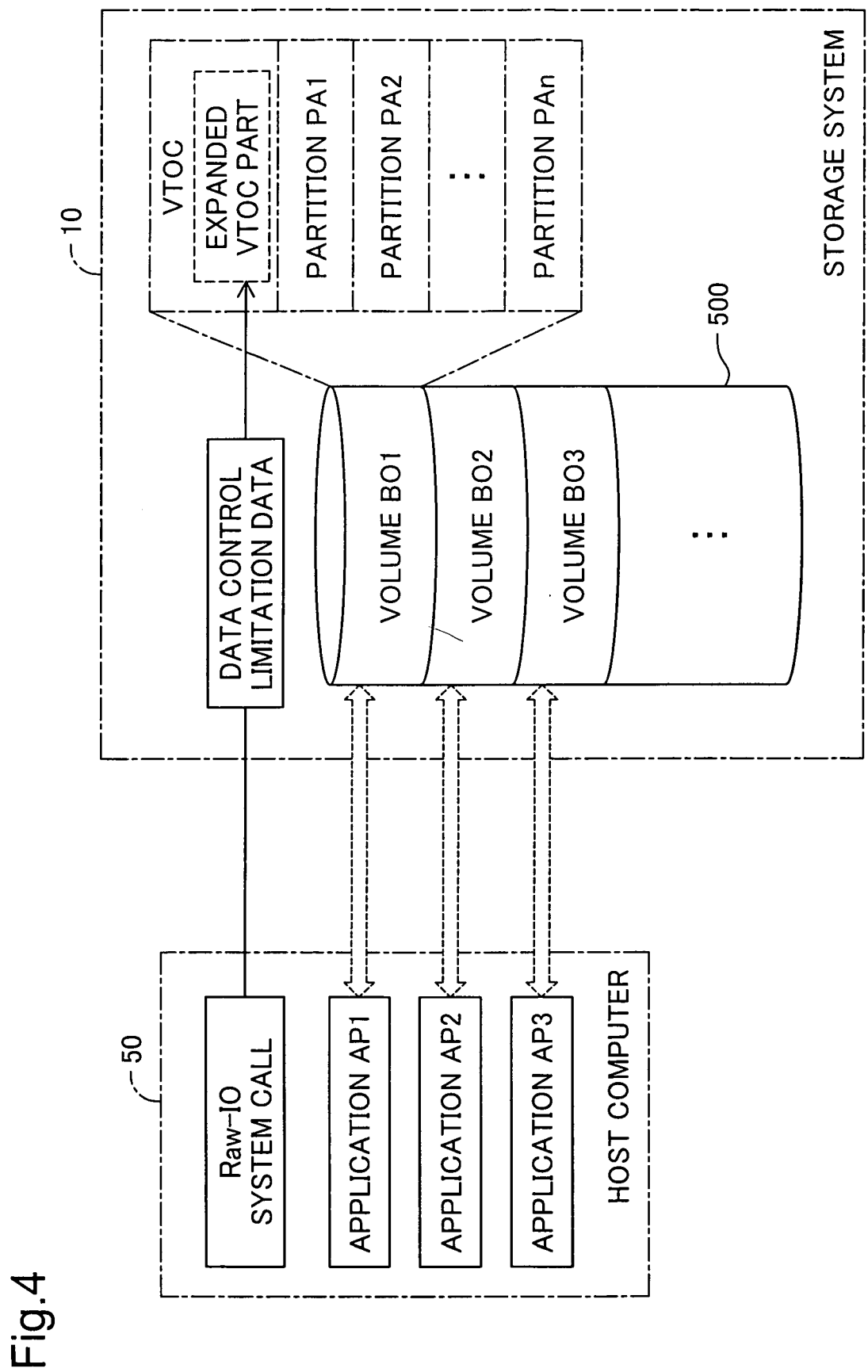
FIG. 4 schematically illustrates the processes in FIG. 3.

A(2). Operation of Electronic Computer System CS:

FIG. 3 is a flowchart of a limitation data writing process in the host computer 50 and a data writing process in the storage system 10. FIG. 4 schematically illustrates the processes in FIG. 3. The limitation data writing process in the host computer 50 is a process for writing data control limitation data stipulating the limitations on backing up the data stored in the volume used by the host computer 50, to the storage system 10. In this embodiment, the process is executed by operations of the CPU based on software in the host computer 50. The data writing process in the storage system 10 is a process in which the data for which a write command has been issued by the host computer 50 is written to the volume formed in the storage section 500. In this embodiment, the process is executed by operations of the CPU 210 based on the software in the storage system 10. In this embodiment, the host computer 50 starts the limitation data writing process based on commands from the administrator of the host computer 50 through the host control terminal 55.

The host computer 50 receives the input of the data control limitation data from the administrator through the host control terminal 55 at the start of the limitation data writing process shown in FIG. 3 (Step S110). FIG. 5 illustrates an example of data control limitation data. The data control limitation data includes data such as the data control mode showing whether or not data can be backed up and data control conditions showing the back up limitation state. In this embodiment, the data control mode employs a "0" from the binary data to indicate that back up can be done, and employs a "1" to indicate that back up cannot be done. In this embodiment, the data control conditions include the number of times back up has been authorized, and the authorization time zone which is the period of time in which back up is authorized. In this embodiment, the authorization time zone can indicate various time periods such as dates, days of the week, and hours/minutes.

After the host computer 50 has received the input of the data control limitation data (Step S110), a command is issued to the storage system 10 to write the data control limitation data to a storage area, from among the storage areas in the volume where the back up is controlled by the data control limitation data, that is different from the storage area storing the data handled by the applications making use of the volume to store the data (Step S120). In this embodiment, the storage area to which the data control limitation data is written is an expanded VTOC part which is protected as the volume table of contents (VTOC) where file control data for controlling files is stored, as shown in FIG. 4. In this embodiment, the command to write the data control limitation data is executed using a Raw-IO system call, which is an OS function, to write the data control limitation data to the expanded VTOC part not handled by the file system.

After the storage system 10 receives the command from the host computer 50 to write the data control limitation data (Step S230) and the data control limitation data is written to the expanded VTOC part of the volume BO1 which is the data control limitation target (Step S240), a response that the data has been written is given to the host computer 50 (Step S250).

The host computer 50 then receives the response from the storage system 10 that the data has been written (Step S160) and notifies the user of the process results (Step S170), completing the limitation data writing process.

Figure 6:
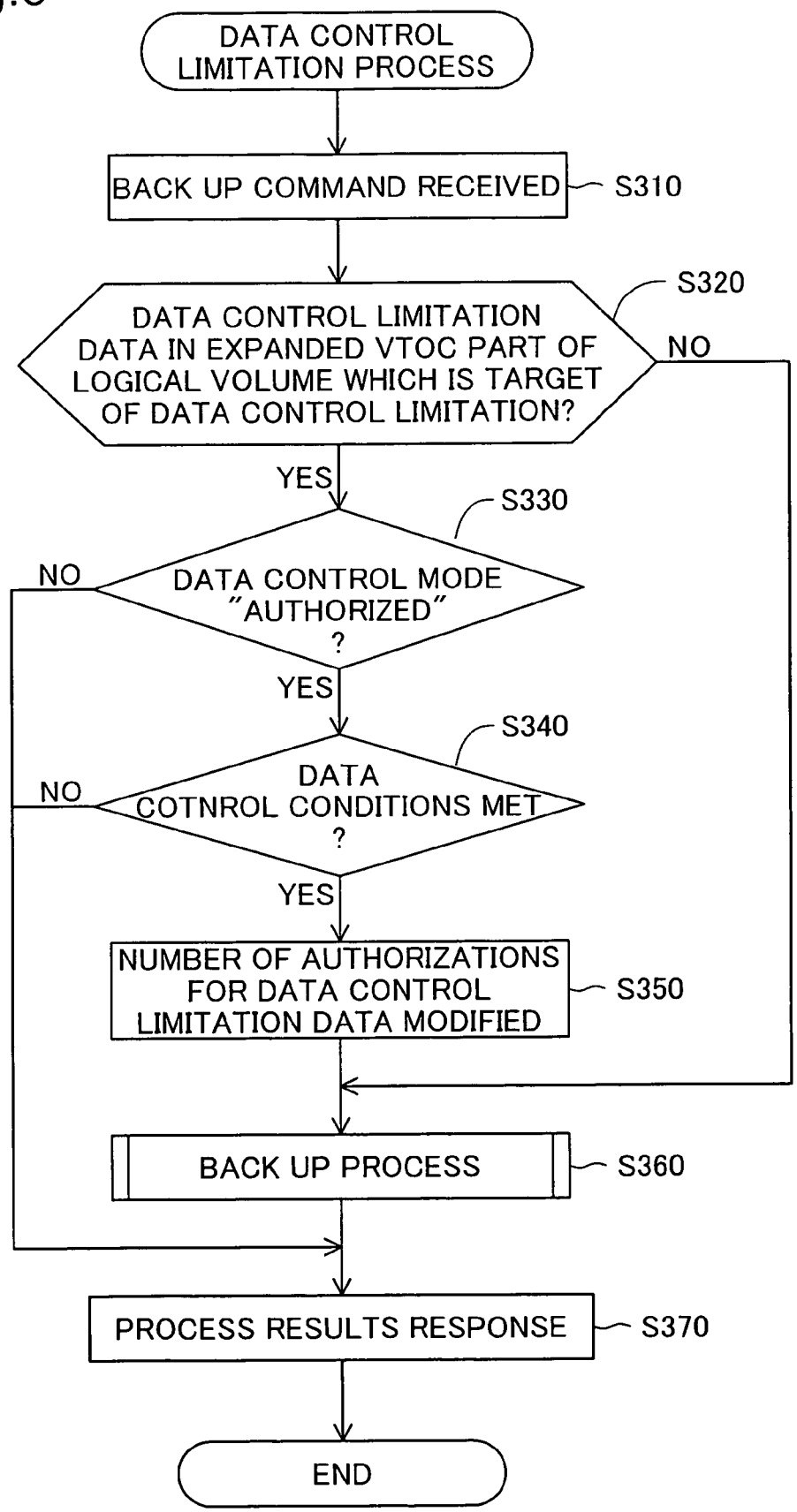
FIG. 6 is a flowchart of a data control limitation process in the storage system 10.

FIG. 6 is a flowchart of a data control limitation process in the storage system 10. The data control limitation process is a process for controlling back up when a command is issued to back up the data stored in the volume. In this embodiment, the process is run by operations based on CPU 210 software in the storage system 10. In this embodiment, the storage system 10 starts the data control limitation process during requests for back preset in the storage system 10, requests for back up preset in the storage control terminal 35, requests for back up by the administrator of the storage system from the storage control terminal 35, and the like.

The storage system 10 receives a back up command at the start of the data control limitation process (Step S310), and determines whether or not there is data control limitation data in the expanded VTOC part of the volume which is the target of back up (Step S320). When there is no data control limitation data in the expanded VTOC part of the volume targeted for back up (Step S320), the back up process is run (Step S360). If, on the other hand, there is data control limitation data in the expanded VTOC part of the volume targeted for back up, the data control mode of the data control limitation data authorizes back up (Step S330). When the data control conditions of the data control limitation data are met (Step S340), the number of authorizations of the data control conditions is decremented by 1 (Step S350), and the back up process is run (Step S360). When the data control mode of the data control limitation data does not authorize back up (Step S330) or when the data control conditions of the data control limitation data are not met (Step S340), the back up process is not run (Step S360). The data control limitation process is then complete after the back up history is recorded and a response on the process results has been sent to the storage control terminal 35 (Step S370).

The storage system 10 in the first embodiment above allows back up on the storage system 10 side to be limited by writing the data control limitation data to the expanded VTOC part upon command by an administrator with authorized access, from the host computer 50 side, to the expanded VTOC part in the volume offered by the storage system 10 to the host computer 50. It is thus possible to protect the safety of the data stored in the storage system 10 while minimizing the processing load on the storage system 10. Back up on the storage system 10 side can also be limited by an administrator authorized to use the host computer 50 at the OS level.

B. Second Example

The structure of the electronic computer system CS in the second example is the same as that of the electronic computer system CS in the first example. The operation of the electronic computer system CS in the second example is also the same as that of the electronic computer system CS in the first example except for the manner in which the back up is limited.

Figure 7:
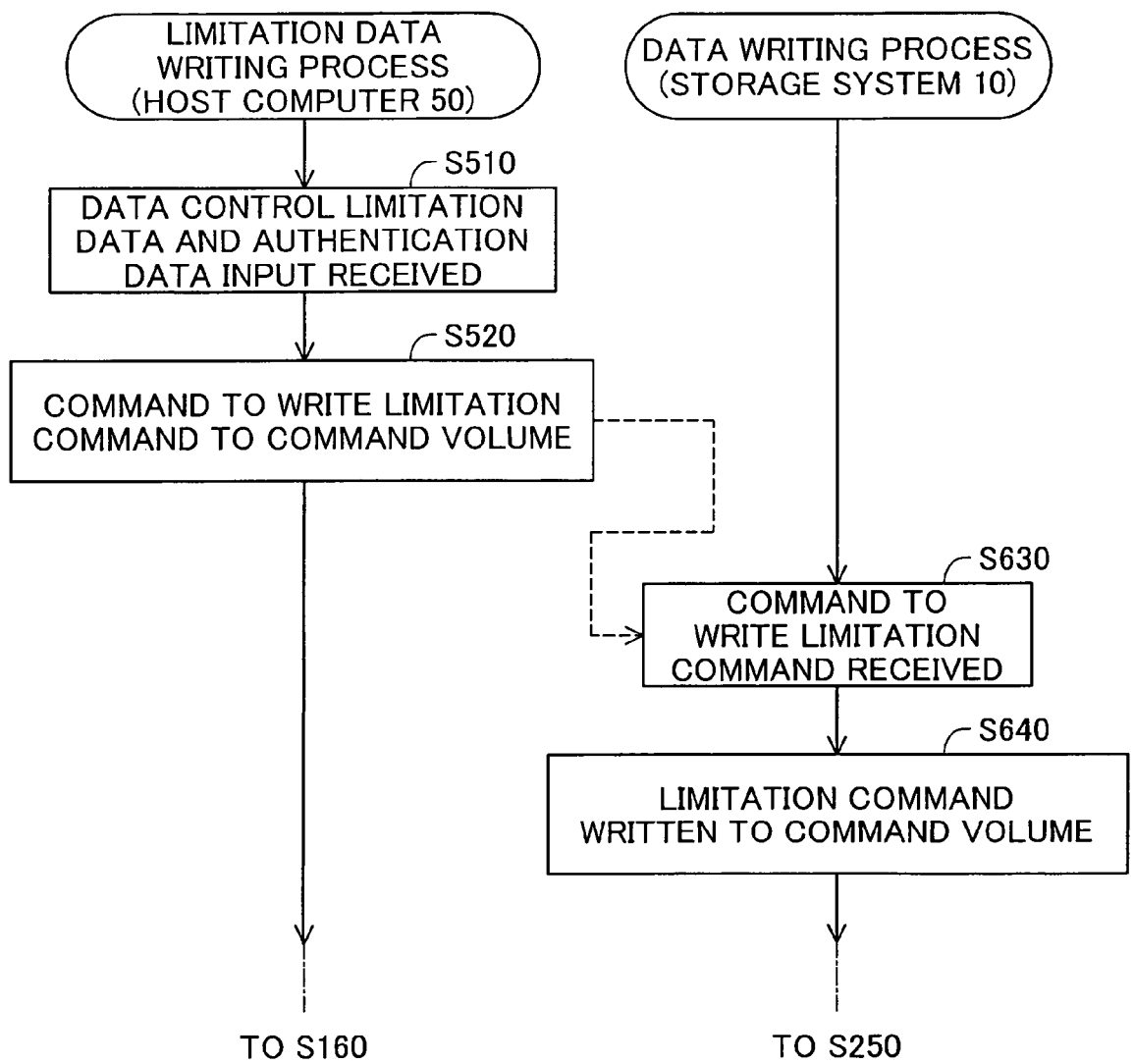
FIG. 7 is a flowchart of a limitation data writing process in the host computer 50 and a data writing process in the storage system 10 in the second example.
Figure 8:
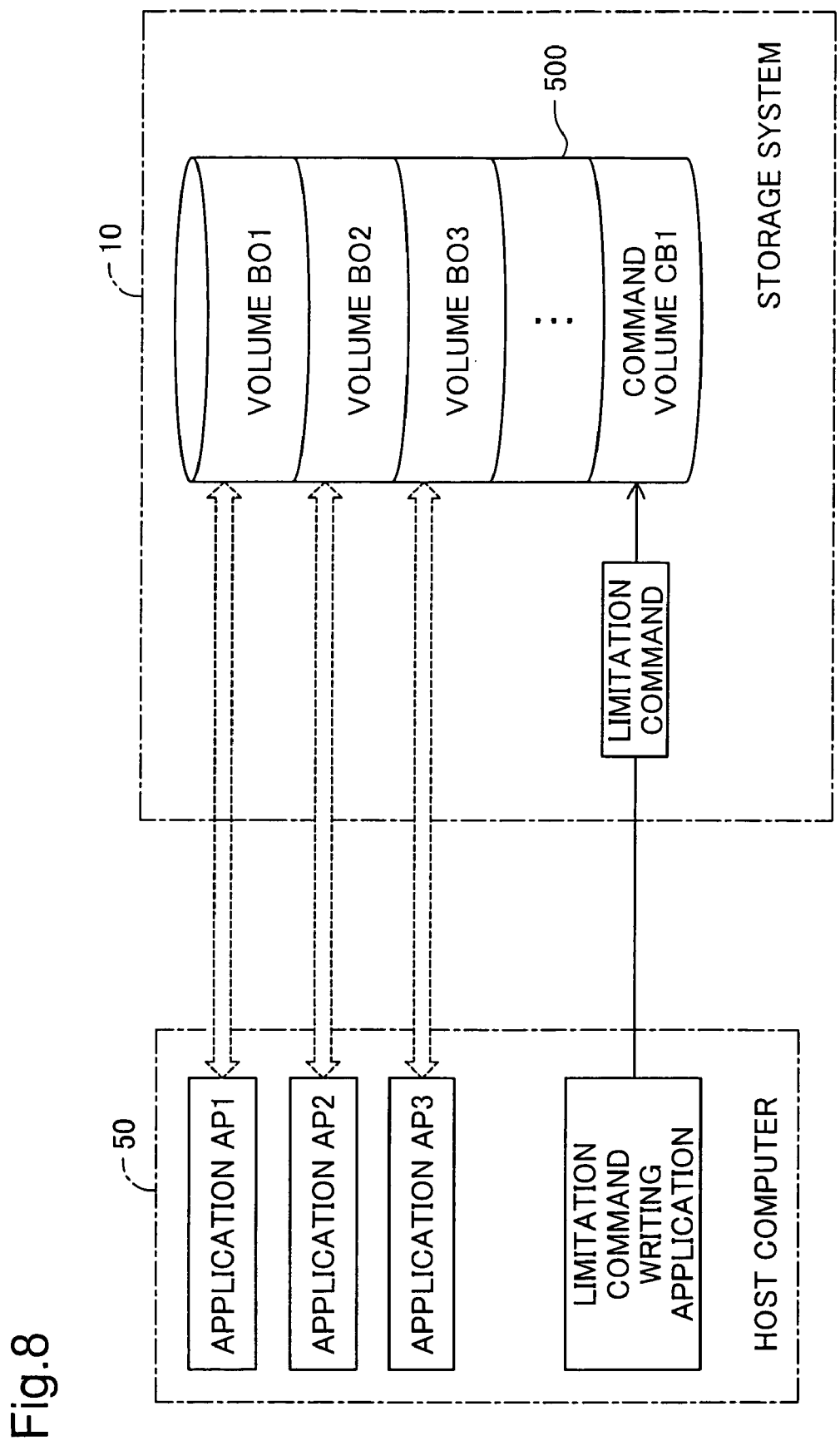
FIG. 8 schematically illustrates the processes in FIG. 7.

FIG. 7 is a flowchart of a limitation data writing process in the host computer 50 and a data writing process in the storage system 10 in the second example. FIG. 8 schematically illustrates the processes in FIG. 7. The second example is similar to the first except for the way data is handled to limit back up.

Figures 9, 10:
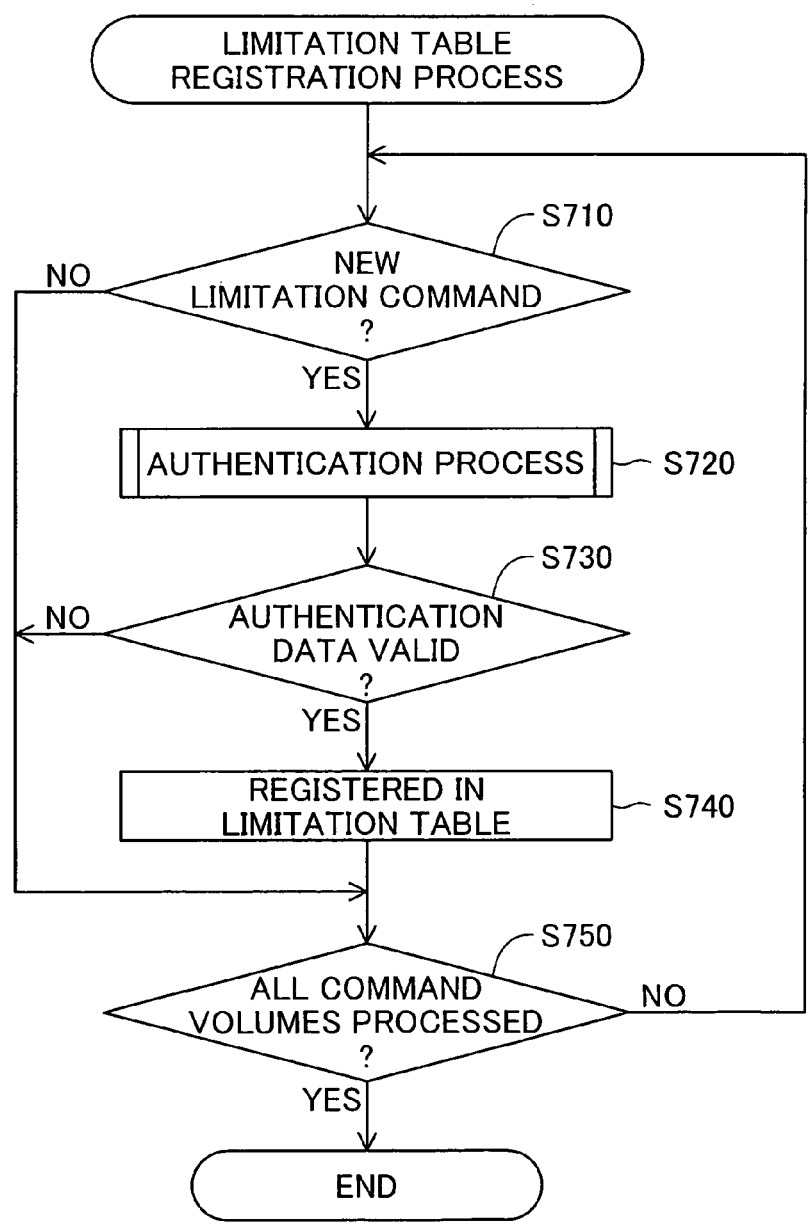
FIG. 9 illustrates an example of a limitation command.
FIG. 10 is a flowchart of a limitation table registration process in the storage system 10.

When the limitation data writing process in FIG. 7 is started, the host computer 50 receives the input of data control limitation data from the administrator through the host control terminal 55 (Step S510). Unlike the first example, in the second example authentication data input is received in addition to the data control limitation data in FIG. 5. The authentication data is data issued by the certificate server 80, and is data for verifying that the administrator is authorized to input the data control limitation data. FIG. 9 illustrates an example of a limitation command. In the second example, the limitation command produced by the host computer 50, which is executable by the RAID controller 200 of the storage system 10, comprises authentication data and the data control limitation data, as well as the name of the volume targeted for limitation, which show the logical volume targeted for back up limitation.

After the host computer 50 has received the input of the data control limitation data (Step S510), a command to write the limitation command to a logical volume different from the logical volume in which back up is limited by the data control limitation data is sent to the storage system 10 (Step S520). In the second example, the storage area where the limitation command is written is the command volume CB1, which is a logical volume different from the volume BO1 used by the host computer 50 to run application AP1, as shown in FIG. 8. The command volume CB1 is preset for the writing of the limitation command on the storage system 10 side. One command volume is pre-assigned per a host computer using the storage system 10. In this example, one command volume is assigned per a host computer, but since the command volume is a virtual construction, a plurality of command volumes may be assigned to each host computer by suitably establishing software for the storage system 10 and host computer 50. A single command volume may also be assigned to a plurality of host computers. In the second example, a control command writing application is run to produce commands to write control commands, but the Raw-IO system call, which is an OS function, may also be used to produce commands to write control commands.

After the storage system 10 receives the command from the host computer 50 to write the control command (Step S630) and the control command is written to the command volume CB1 assigned to the host computer 50 (Step S640), a response that the command has been written is sent to the host computer 50 (Step S250). The subsequent operations of the host computer 50 are the same as the process in FIG. 3 (Steps S160, S170).

FIG. 10 is a flowchart of a limitation table registration process in the storage system 10. FIG. 11 illustrates an example of a limitation table. The limitation table registration process is a process in which data control limitation data included in the limitation command written to the command volumes by the process in FIG. 7 is registered in the limitation table. In this example, the process is run by operations based on CPU 210 software in the storage system 210. The limitation table in FIG. 11 is data that is referenced when limiting back up, and is where the data control limitation data for each volume is registered. In this example, the limitation table is stored in RAM 212. In this example, the storage system 10 repeatedly runs the limitation table registration process in FIG. 10 at prescribed timing.

At the start of the limitation table registration process, the storage system 10 determines whether or not a new limitation command has been written to the command volume (Step S710). When a new limitation command has been written, the limitation command authentication process is run (Step S720). In the authentication process, the storage system 10 accesses the certificate server 80 connected to the network 60 through the firewall 85 set up between the network 30 and network 60, and requests the certificate server 80 to verify the authentication data included in the limitation command. When the authentication data is valid (Step S730), the limitation data is determined to be legitimate data, and the data control limitation data included in the control command is registered to the limitation table in FIG. 11 (Step S740). After all the command volumes formed in the storage section 500 have been similarly processed (Step S750), the limitation table registration process is complete.

Figure 12:
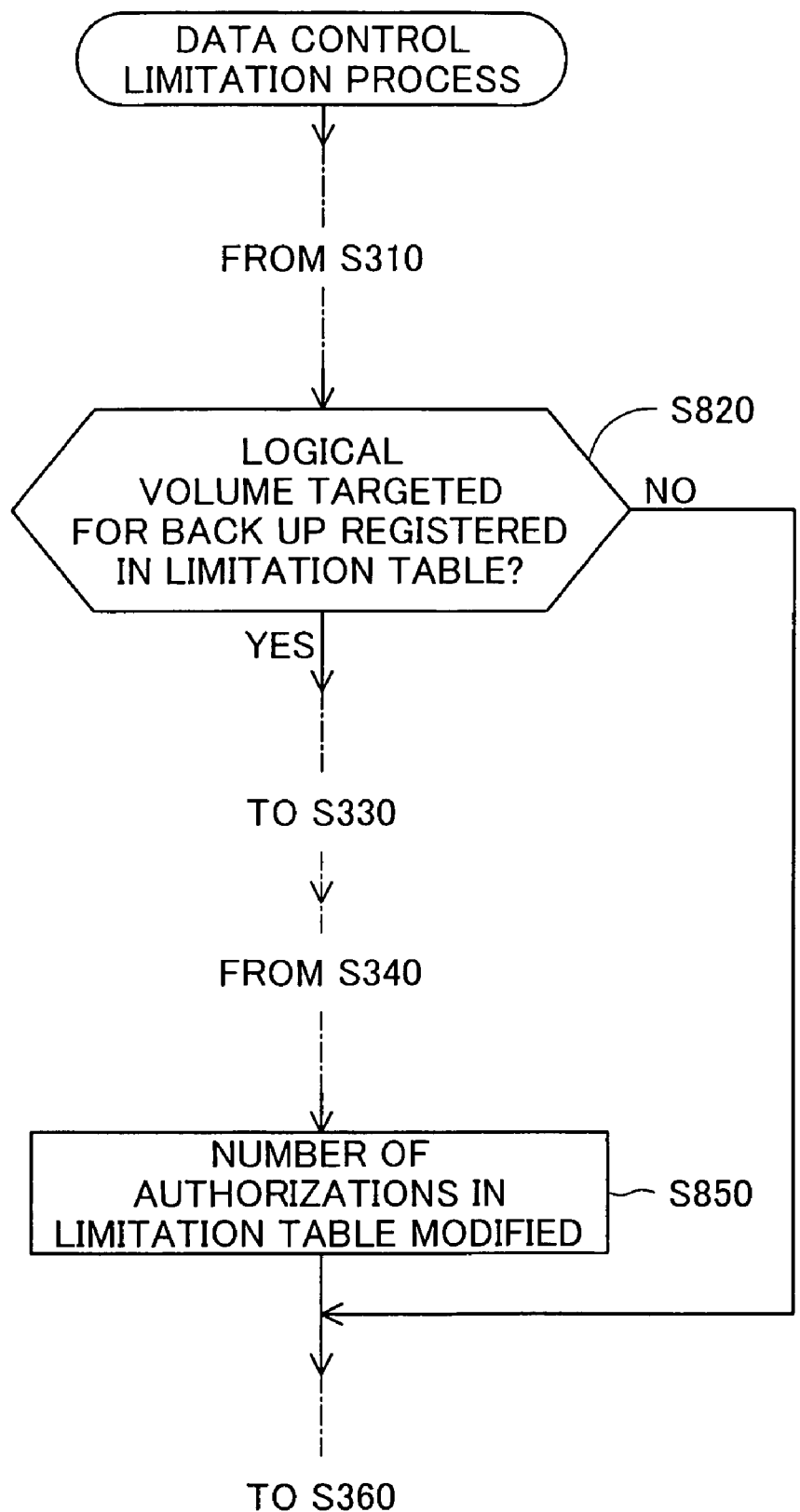
FIG. 12 is a flowchart of a data control limitation process in the storage system 10 in the second example.

FIG. 12 is a flowchart of a data control limitation process in the storage system 10 in the second example. The data control limitation process in the second example is similar to that in the first example illustrated in FIG. 6 except for the determination as to whether or not the volume targeted for back up has been registered in the limitation table (Step S820) and the fact that the number of limitation table authorizations during back up is decremented by "1."

The storage system 10 in the second example above allows the safety of data stored in the storage system 10 to be protected while minimizing the processing load on the storage system 10 in the same manner as the first example. Back up on the storage system 10 side can also be limited by an administrator authorized to use the host computer 50 at the OS level.

C. Other Embodiments

Embodiments of the invention were described above, but the invention is not in any way limited to these embodiments, and is capable of a variety of modifications within the scope of the invention. For example, the above embodiments were examples of limiting back up by the transfer of data from the storage system 10 to the storage system 20, but the invention is also applicable in cases for limiting back up by data transfer to other volumes in the storage system 10.

In the first example, the expanded VTOC part to which the data control limitation data is written was set up in the VTOC, but an expanded VTOC part may be set up in storage areas other than the VTOC in the volume BO1, and data capable of referencing the expanded VTOC part can be stored in the VTOC.

The various devices forming the electronic computer system CS can be connected in a variety of ways. Devices may be directly connected to each other through a network. Methods for connecting the storage system 10 and host computer 50 are not limited to fibre channels, but can also include interfaces other than fibre channels, such as SCSI (Small Computer System Interface), iSCSI (internet SCSI), Gigabit Ethernet (trademark of Ethernet), main frame serial channels, and main frame fibre channels. In the above examples, the storage section 500 was composed of a plurality of HDD 510, but the storage section 500 can be composed of various types of storage, such as optical disk, drives, semiconductor memory, and magnetic tape drives.

All changes within the meaning and range of equivalency of the claims are intended to be embraced therein. The scope and sprit of the present invention are indicated by the appended claims, rather than by the foregoing description.

What is claimed is:

1. A backup control method for controlling a backup of data stored in a volume which is provided to a host computer by a storage system, said storage system comprises a control computer that controls data transfer between said host computer and said volume, said stored data is handled by said host computer running prescribed application software, said backup control method comprising the steps of:
(a) receiving a write request by said control computer for writing limitation data for stipulating a limitation of said backup from said host computer running control application software different from said prescribed application software;
(b) writing said limitation data, in accordance with said received write request, to a prescribed storage area in said storage system, said prescribed storage area is different from a storage area where said stored data is stored; and
(c) controlling said backup based on said limitation data written to said prescribed storage area.

2. The backup control method according to claim 1, wherein an individual authorized to access said host computer running said control application software is limited, and
said prescribed storage area is a part of a volume table of contents for storing file control data for controlling files in said volume.

3. The backup control method according to claim 2, wherein said write request by said host computer is executed using a system call.

4. The backup control method according to claim 1, wherein an individual authorized to access said host computer running said control application software is limited, and
said prescribed storage area is referred to by reference data stored in a volume table of contents for storing file control data for controlling files in said volume.

5. The backup control method according to claim 1, wherein said limitation data is command data executable by said control computer, and includes authentication data for verifying an individual authorized to access said host computer running said control application software, and
said prescribed storage area is a command volume different from said volume where said stored data is stored,
said step of (c) comprising:
checking validity of said authentication data included said limitation data written to said command volume;
registering said limitation data with said valid authentication data on said control computer; and
limiting said backup according to said registered limitation data.

6. The backup control method according to claim 1, said backup including at least one of transferring said stored data to another storage system different from said storage system, and transferring said stored data to another volume in said storage system different from said volume.

7. The backup control method according to claim 1, said limitation data including data indicating at least one of whether said backup is permitted, a manner in which of said is executed, the number of times said backup is executed, and a period of time in which said backup is executed.

8. A storage system provides a volume in which data is stored to a host computer and controls a backup of said stored data, said stored data is handled by said host computer running prescribed application software, said storage system comprising:
a receiving unit that receives a write request for writing limitation data for stipulating a limitation of said backup from said host computer running control application software different from said prescribed application software;
a writing unit that writes said limitation data, in accordance with said received write request, to a prescribed storage area in said storage system, said prescribed storage area is different from a storage area where said stored data is stored; and
a back up control unit that controls said backup based on said limitation data written to said prescribed storage area.

9. The storage system according to claim 8, wherein said write request received by said receiving unit is send from said host computer, an individual to access said host computer running said control application software is limited, and said prescribed storage area is a part of a volume table of contents for storing file control data for controlling files in said volume.

10. The storage system according to claim 9, wherein said write request received by said receiving unit is send by a system call.

11. The storage system according to claim 8, wherein said write request received by said receiving unit is send from said host computer, an individual to access said host computer running said control application software is limited, and said prescribed storage area is referred to by reference data stored in a volume table of contents for storing file control data for controlling files in said volume.

12. The storage system according to claim 11, wherein said limitation data is command data executable by said back up control unit, and includes authentication data for verifying an individual authorized to access said host computer running said control application software, said prescribed storage area is a command volume different from said volume where said stored data is stored, and said back up control unit comprises:

a checking unit that checks validity of said authentication data included said limitation data written to said command volume;

a memory for registering said limitation data with said valid authentication data; and a limiting unit that limits said backup according to said registered limitation data.

13. The storage system according to claim 1, said backup including at least one of transferring said stored data to another storage system different from said storage system, and transferring said stored data to another volume in said storage system different from said volume.

14. The storage system according to claim 1, said limitation data including data indicating at least one of whether said backup is permitted, a manner in which of said backup is executed, the number of times said backup is executed, and a period of time in which said backup is executed.

* * * * *